United States Patent [19]

Cseh et al.

[11] 3,978,038
[45] Aug. 31, 1976

[54] DISAZO PIGMENTS CONTAINING AT LEAST ONE NITRO GROUP ON THE DIAZO COMPONENT

[75] Inventors: Georg Cseh, Basel; Armand Roueche, Bottmingen, both of Switzerland

[73] Assignee: Ciba-Geigy Corporation, Ardsley, N.Y.

[22] Filed: Feb. 27, 1974

[21] Appl. No.: 446,188

[30] Foreign Application Priority Data

Mar. 7, 1973 Switzerland.......................... 3315/73

[52] U.S. Cl................................. 260/176; 106/23; 106/288 Q; 106/308 R; 106/308 F; 260/37 R; 260/39 P; 260/40 R; 260/40 TN; 260/42.21; 428/411; 428/412; 428/423; 428/446; 428/473; 428/480; 428/492; 428/500

[51] Int. Cl.².................... C09B 38/16; D06P 1/08; D06P 3/00

[58] Field of Search..................... 260/176

[56] References Cited
UNITED STATES PATENTS

| | | | |
|---|---|---|---|
| 1,505,568 | 8/1924 | Laska et al. ................... | 260/176 X |
| 1,933,431 | 10/1933 | Henle et al. ..................... | 260/176 |
| 2,009,397 | 7/1935 | Goldstein........................... | 260/176 |
| 2,153,539 | 4/1939 | Laska et al. ...................... | 260/176 |
| 2,591,470 | 4/1952 | Schmid et al. ...................... | 260/176 |
| 2,676,958 | 4/1954 | Hanhart............................. | 260/176 |
| 3,413,279 | 11/1968 | Mueller............................... | 260/176 |
| 3,513,154 | 5/1970 | Towle et al. ........................ | 260/176 |

*Primary Examiner*—Floyd D. Higel
*Attorney, Agent, or Firm*—Vincent J. Cavalieri

[57] ABSTRACT

New disazo pigments of the formula

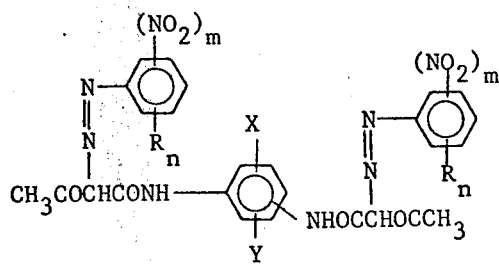

R being hydrogen, halogen, alkyl, alkoxy, nitrile, trifluormethyl, aryloxy, phenylsulfonyl or benzoyl, $m$ and $n$ 1 or 2, X hydrogen, halogen, alkyl, alkoxy, nitro, nitrile, trifluormethyl or carboxylic acid ester are prepared. The compounds are useful for pigmenting high molecular weight organic materials such as polyamides, polyurethanes and polyesters.

2 Claims, No Drawings

DISAZO PIGMENTS CONTAINING AT LEAST ONE NITRO GROUP ON THE DIAZO COMPONENT

It has been found that new valuable disazo pigments of the formula

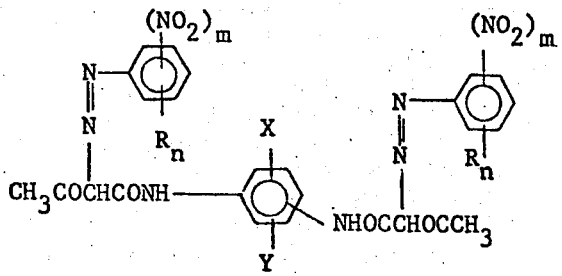

wherein R denotes a hydrogen or halogen atom, an alkyl or alkoxy group containing 1 to 4 carbon atoms, a nitrile or trifluoromethyl group or an aryloxy, phenylsulphonyl or benzoyl group which is, for example, substituted by halogen atoms or alkyl or alkoxy groups containing 1 – 4 carbon atoms, $m$ and $n$ denote the numbers 1 or 2, X denotes a hydrogen or halogen atom, an alkyl or alkoxy group containing 1 to 4 carbon atoms or a nitro, nitrile, trifluoromethyl or carboxylic acid ester group and Y denotes a hydrogen or halogen atom, an alkyl group containing 1 to 4 carbon atoms or a nitro, nitrile, trifluoromethyl or carboxylic acid ester group, are obtained when a diazo or diazoamino compound of an amine of the formula

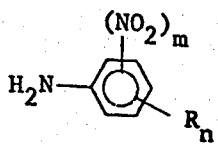

is coupled with a bis-acetoacetyl-phenylenediamine of the formula

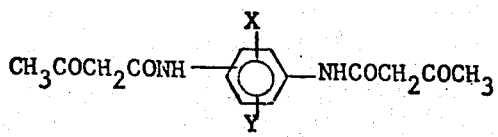

in the molar ratio of 2:1.

Particular interest attaches to disazo pigments of the formulae

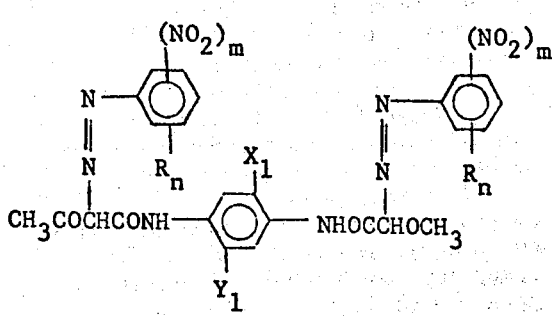

wherein R, $m$ and $n$ have the indicated meaning, $X_1$ denotes a hydrogen or halogen atom or an alkyl or alkoxy group containing 1 – 4 carbon atoms and $Y_1$ denotes a hydrogen or halogen atom or an alkyl group containing 1 – 4 carbon atoms, and especially those of the formula

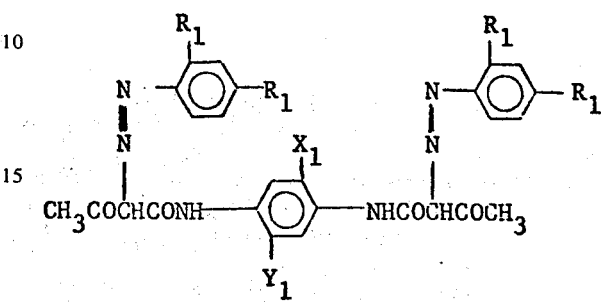

wherein one $R_1$ denotes a nitro group and the other denotes an alkoxy group containing 1 – 4 carbon atoms.

Diazo components used are preferably those of the formula

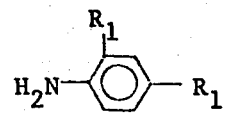

wherein $R_1$ has the indicated meaning.

As examples there may be mentioned: 2-nitro-aniline, 2-nitro-4-chloro-aniline, 2-nitro-5-chloro-aniline, 2-nitro-6-chloro-aniline, 2-nitro-4-methyl-aniline, 2-nitro-5-methyl-aniline, 2-nitro-4-methoxy-aniline, 2-nitro-5-methoxy-aniline, 2-nitro-5-ethoxy-aniline, 2-nitro-4-trifluoromethyl-aniline, 2-nitro-4,5-dichloroaniline, 2-nitro-4-methoxy-5-chloroaniline, 3-nitro-aniline, 3-nitro-4-methyl-aniline, 3-nitro-4-methoxy-aniline, 3-nitro-4-ethoxy-aniline, 3-nitro-4-chloroaniline, 3-nitro-6-chloro-aniline, 3-nitro-6-methyl-aniline, 3-nitro-6-methoxy-aniline, 4-nitro-aniline, 4-nitro-2-chloroaniline, 4-nitro-2-methoxy-aniline, 4-nitro-2-ethoxy-aniline, 4-nitro-3-ethoxy-aniline, 4-nitro-2-cyano-aniline, 4-nitro-2-methyl-aniline, 4-nitro-2-trifluoromethyl-aniline, 4-nitro-2,5-dichloro-aniline, 4-nitro-2,6-dichloro-aniline, 4-nitro-2-chloro-5-methyl-aniline, 4-nitro-5-chloro-2-methyl-aniline, 4-nitro-2-chloro-5-methoxy-aniline, 4-nitro-5-chloro-2-methoxyaniline, 4-nitro-2,5-dimethyl-aniline, 4-nitro-2,5-dimethoxyaniline, 4-nitro-2,5-diethoxy-aniline, 4-nitro-2-methoxy-5-methyl-aniline, 2,4-dinitro-aniline, 2,4-dinitro-6-chloroaniline, 2,4-dinitro-6-cyano-aniline, 3-nitro-4-amino-diphenylsulphone, 3-nitro-4-amino-4'-chloro-diphenylsulphone, 3-nitro-4-amino-4'-methyl-diphenylsulphone, 3-nitro-4-amino-4'-methoxydiphenylsulphone, 3-nitro-4-amino-benzophenone, 3-nitro-4-amino-4'-chloro-benzophenone, 3-nitro-4-amino-4'-methylbenzophenone, 3-nitro-4-amino-4'-methoxybenzophenone, 3-nitro-6-amino-benzophenone, 3-nitro-6-amino-4'-chloro-benzophenone, 3-nitro-6-amino-4'-methyl-benzophenone, 3-nitro-6-amino-4'-methoxy-benzophenone, 2-amino-3-nitro-benzophenone, 2-amino-4-nitro-4'-methyl-benzophenone and 2-amino-5-nitro-4'-methyldiphenylsulphone.

Coupling components used are preferably those of the formula

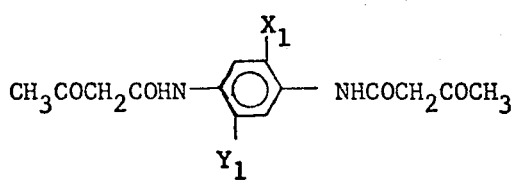

wherein $X_1$ and $Y_1$ have the indicated meaning.

These are known compounds which are obtained by the action of diketene or acetoacetic acid esters on the corresponding phenylenediamines, such as, for example: 1,4-phenylenediamine, 2-chloro-1,4-phenylenediamine, 2-bromo-1,4-phenylenediamine, 2-trifluoromethyl-1,4-phenylenediamine, 2-cyano-1,4-phenylenediamine, 2-methyl-1,4-phenylenediamine, 2-methoxy-1,4-phenylenediamine, 2-ethoxy-1,4-phenylenediamine, 2-propoxy-1,4-phenylenediamine, 2-iso-propoxy-1,4-phenylenediamine, 2-butoxy-1,4-phenylenediamine, 2-phenoxy-1,4-phenylenediamine, 2-nitro-1,4-phenylenediamine, 2-methoxycarbonyl-1,4-phenylenediamine, 2-ethoxycarbonyl-1,4-phenylenediamine, 2,5-diethoxycarbonyl-1,4-phenylenediamine, 2,3-dichloro-1,4-phenylenediamine, 2,5-dichloro-1,4-phenylenediamine, 2,6-dichloro-1,4-phenylenediamine, 2,6-bis-trifluoromethyl-1,4-phenylenediamine, 2,6-dibromo-1,4-phenylenediamine, 2-chloro-5-methyl-1,4-phenylenediamine, 2-chloro-5-methoxy-1,4-phenylenediamine, 2-chloro-5-ethoxy-1,4-phenylenediamine, 2,5-dimethyl-1,4-phenylenediamine, 2-methyl-5-methoxy-1,4-phenylenediamine, 2-methyl-5-ethoxy-1,4-phenylenediamine, 2-methyl-5-propoxy-1,4-phenylenediamine, 2-methyl-5-iso-propoxy-1,4-phenylenediamine, 2-methyl-5-butoxy-1,4-phenylenediamine, 2,3,5-trichloro-1,4-phenylenediamine, 2,3,5-tribromo-1,4-phenylenediamine, 2,3,5,6-tetrachloro-1,4-phenylenediamine, 2,5-dimethyl-3,6-dichloro-1,4-phenylenediamine, 1,3-phenylenediamine, 4-chloro-1,3-phenylenediamine, 4-bromo-1,3-phenylenediamine, 2-methyl-1,3-phenylenediamine, 4-methyl-1,3-phenylenediamine, 4-methoxy-1,3-phenylenediamine, 2,4-dichloro-1,3-phenylenediamine, 2,5-dichloro-1,3-phenylenediamine, 4,6-dichloro-1,3-phenylenediamine, 4,6-dimethyl-1,3-phenylenediamine, 2,6-dimethyl-1,3-phenylenediamine, 1,4-naphthylenediamine, 1,5-naphthylenediamine, 2,6-naphthylenediamine and 2,3,5,6-tetramethyl-1,4-phenylenediamine.

The coupling is preferably carried out in a weakly acid medium, suitably in the presence of customary agents which assist coupling. As such, there may in particular be mentioned dispersing agents, for example aralkylsulphonates, such as dodecylbenzenesulphonate, or 1,1'-dinaphthylmethane-2,2'-disulphonic acid or polycondensation products of alkylene oxides. The coupling can furthermore be carried out in the presence of texture-improving agents. The dispersion of the coupling component can also advantageously contain protective colloids, for example methylcellulose or minor amounts of inert sparingly water-soluble, or water-insoluble, organic solvents, for example optionally halogenated or nitrated aromatic hydrocarbons, such as benzene, toluene, xylene, chlorobenzene, dichlorobenzene or nitrobenzene, as well as aliphatic halogenated hydrocarbons such as, for example, carbon tetrachloride or trichloroethylene, and also water-miscible organic solvents, such as acetone, methyl ethyl ketone, methanol, ethanol or isopropanol.

The coupling can also advantageously be carried out by continuously combining an acid solution of the diazonium salt with an alkaline solution of the coupling component in a mixing nozzle, whereupon immediate coupling of the components takes place. Care must be taken that the diazo component and the coupling component should be present in equimolecular amounts in the mixing nozzle and it has been found advantageous to use a slight excess of the diazo component. This is most simply achieved by checking the pH value of the liquid in the mixing nozzle. It is also necessary to ensure that vigorous turbulent mixing of the two solutions should take place in the mixing nozzle. The resulting dyestuff dispersion is continuously withdrawn from the mixing nozzle and the dyestuff is isolated by filtration.

If different diazo components are present in the same or different molar ratios to one another, the diazo components and coupling component can be coupled to give mixtures of several dyestuffs.

The coupling can also be carried out by heating a diazoamino compound of the amine to be used as the diazo component with the diacetoacetylphenylenediamine in an organic solvent, optionally in an aqueous-organic solvent, preferably in the presence of an acid.

The diazoamino compounds to be used according to the process are obtained according to known processes by coupling a diazonium salt of the amine serving as the diazo component with a primary or, preferably, with a secondary amine. The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, aliphatic amines such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalenesulphonic acid, 1-aminonaphthalene-2,4-disulphonic acid, heterocyclic amines such as piperidine, morpholine, pyrrolidine and dihydroindole and finally also sodium cyanamide or dicyandiamide.

As a rule, the diazoamino compounds obtained are sparingly soluble in cold water and can, if necessary after salting out, be isolated from the reaction medium in a crystalline form. In many cases, the moist press cakes can be used for the subsequent reaction. In some cases it can prove desirable to dehydrate the diazoamides, prior to the reaction, by vacuum drying, or to suspend the moist press cake in a solvent and then to remove the water by azeotropic distillation.

The coupling of the diazoamino compounds with the naphthol is carried out in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidone, formic acid or acetic acid. When using solvents which are water-miscible it is not necessary to use the diazoamino compound in the anhydrous form. For example, the water-moist filter cakes can be used. The splitting of the diazoamino compound which precedes the coupling takes place in an acid medium. If neutral solvents are used, it is necessary to add an acid, for example hydrogen chloride, sulphuric acid, formic acid, acetic acid or chloroacetic acid.

The coupling is suitably carried out warm, preferably at temperatures between 80° and 180°C, and in general takes place very rapidly and completely.

By virtue of their insolubility, the pigments obtained can be isolated from the reaction mixtures by filtration. It proves to be advantageous to after-treat the resulting pigments by heating them with water under pressure or with an organic solvent which preferably boils above 100°C. Particularly suitable solvents prove to be benzenes substituted by halogen atoms or alkyl or nitro groups, such as xylenes, chlorobenzene, o-dichlorobenzene or nitrobenzene, as well as pyridine bases such as pyridine, picoline or quinoline, and also ketones, such as cyclohexanone, ethers, such as ethylene glycol monomethyl ether or monoethyl ether, amides, such as dimethylformamide or N-methyl-pyrrolidine, as well as sulphoxone.

The after-treatment is preferably carried out by heating the pigment in the solvent, such as benzene, toluene, xylenes, chlorobenzene, dichlorobenzenes, nitrobenzene, dimethylformamide and N-methylpyrrolidone as well as cellosolve and others, to 100° – 180°C, whereupon a coarsening of the particle size occurs in many cases, which has a favourable influence on the fastness to light and migration of the pigments obtained.

Finally, the coupling can also be effected by suspending the amine to be diazotised, together with the coupling component, in the molar ratio of 2:1, in an organic solvent and treating it with a diazotising agent, especially an ester of nitrous acid, such as methyl nitrite, ethyl nitrite, butyl nitrite, amyl nitrite or octyl nitrite.

The new dyestuffs are valuable pigments which can be used, in a finely divided form, for pigmenting high molecular organic material, for example cellulose ethers and cellulose esters, high molecular polyamides and high molecular polyurethanes or polyesters, acetylcellulose, nitrocellulose, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, thermoplastic or curable acrylic resins, rubber, casein, silicone and silicone resins, individually or as mixtures.

For these purposes it is immaterial whether the high molecular compounds mentioned are in the form of plastic masses or melts or in the form of spinning solutions, lacquers or paints. The new pigments prove to be particularly suitable for printing inks. Depending on the end use, it proves to be advantageous to use the new pigments as toners or in the form of preparations. The preparations can for example contain, in addition to the pure pigment, natural resins, for example abietic acid or its esters, ethylcellulose, cellulose acetobutyrate, alkaline earth metal salts of higher fatty acids, fatty amines, for example stearylamine or rosin amine, vinyl chloride/vinyl acetate copolymers, polyacrylonitrile or polyterpene resins or water-soluble dyestuffs, for example dyestuff-sulphonic acids or their alkaline earth metal salts.

In the examples which follow the parts, unless otherwise stated, denote parts by weight and the percentages denote percentages by weight.

EXAMPLE 1

34.5 Parts of 2-chloro-4-nitro-aniline in 500 parts by volume of glacial acetic acid are stirred with 50 parts by volume of concentrated hydrochloric acid, whereupon the hydrochloride of the base forms. The mixture is then cooled to −5°C by addition of 600 parts of ice and diazotised by addition of 50 parts by volume of 4 N sodium nitrite. The yellow diazo solution is stirred at 0° − 5°C until only traces of nitrous acid remain detectable. The diazo solution is then clarified by filtration, with addition of a little decolourising charcoal. The filtrate is brought to pH 4 by addition of 48 parts of crystalline sodium acetate.

At the same time, 27.6 parts of 1,4-bis-acetoacetylaminobenzene are dissolved in 800 parts of water and 22 parts by volume of 40% strength sodium hydroxide solution, and 5 parts of n-butyl-sulphoricinoleate are added. This solution is clarified by filtration using 0.5 part of decolourising charcoal and is then added dropwise to the diazo solution over the course of 1 − 1½ hours, whilst stirring well. In the course thereof the temperature of the reaction mixture rises to 15° − 20°C. After completion of the dropwise addition, no further diazo compound is detectable in the mixture. The mixture is stirred for 1 hour at room temperature and is then warmed to 80°−85°C in 1 hour and filtered hot, and the product is washed with hot water until free of salt. After drying at 95°−100°C in vacuo, 51.0 parts of an orange-yellow dyestuff of the formula

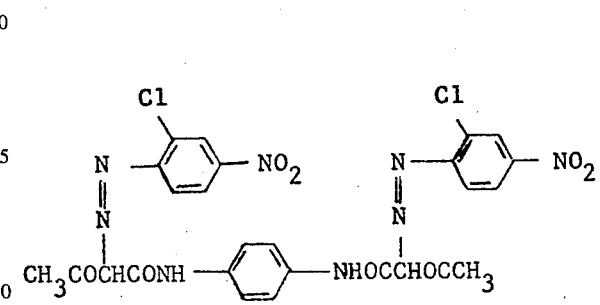

are obtained.

25 Parts of the pigment thus obtained, in 670 parts per volume of dimethylformamide, are stirred for 2 hours at 140°−150°C. Thereupon, the dyestuff assumes a uniform crystalline form. Yellowish crystalline aggregates of 5−10μ length are recognisable under the microscope. The mixture is filtered at 140°C, the dyestuff is washed with hot dimethylformamide until the filtrate issues colourless, the dimethylformamide is then displaced by methanol and finally the dyestuff is again washed with hot water. After drying, 21.5 parts of a luminous yellow pigment dyestuff are obtained. The pigment thus produced is outstandingly suitable for the manufacture of printing inks, having good flow, for the graphic trade, and gives very strong, pure yellow prints of good gloss and transparency.

The treatment in the organic solvent can also be carried out directly with the moist filter cake without prior drying. Thus, the moist press cake can be stirred in picoline at 100°–120°C, filtered off and washed with methanol and then with dilute hydrochloric acid, or the moist press cake is stirred in chlorobenzene, o-dichlorobenzene or nitrobenzene, freed from water by azeotropic distillation and then worked up as described above.

EXAMPLE 2

5.0 Parts of 2-amino-5-nitro-benzophenone in 70 parts by volume of glacial acetic acid are stirred with 6.5 parts by volume of concentrated hydrochloric acid, whereupon the hydrochloride of the base forms. After adding 20 parts of ice and subsequently cooling to −3°C, 5.3 parts by volume of 4 N sodium nitrite are added dropwise. The yellow diazo solution is stirred at 0°–5°C until only traces of nitrous acid remain detectable. The diazo solution is then clarified by filtration, with the addition of a little decolourising charcoal. The filtrate is brought to pH 4 by addition of 15 parts of crystalline sodium acetate.

At the same time, 3.1 parts of 2-chloro-1,4-bis-acetoacetylaminobenzene are dissolved in 100 parts of water and 25 parts by volume of 40% strength sodium hydroxide solution and 5 parts of n-butylsulphoricinoleate are added. This solution is clarified by filtration with a little decolourising charcoal and is then added dropwise to the diazo solution over the course of ½ hour, with good stirring. In the course thereof the temperature of the reaction mixture rises to 15°–20°C. The mixture is stirred for 1 hour at room temperature, then warmed to 80°–85°C for one hour and filtered hot, and the product is washed with hot water until free of salt. After drying in vacuo at 95°–100°C, 7.0 parts of a yellow dyestuff of the formula

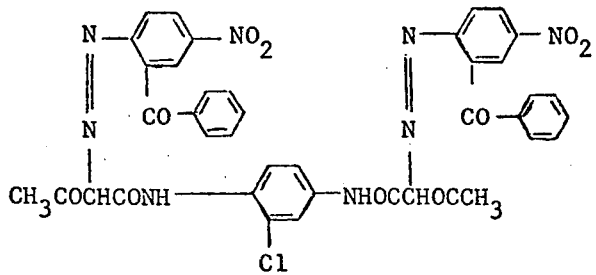

are obtained.

7.0 Parts of the pigment thus obtained are stirred in 80 parts by volume of nitrobenzene for 2 hours at 145°–150°C. In the course thereof, the dyestuff assumes a uniform crystalline form. It is filtered off at 140°C and washed with boiling o-dichlorobenzene until the filtrate issues almost colourless, then with cold methanol and finally with hot water. After drying, 5.5 parts of a greenish-tinged yellow pigment dyestuff are obtained. This gives strong and pure greenishtinged yellow prints when used in printing inks.

EXAMPLE 3

5.0 Parts of 4-amino-3-nitro-diphenylsulphone in 20 parts by volume of glacial acetic acid and 6.5 parts per volume of concentrated hydrochloric acid are diazotised with 5.5 parts by volume of 4 N sodium nitrite at 0°–5°C in the usual manner. The yellow diazo solution is stirred at 0°–5°C until only traces of nitrous acid remain detectable. The diazo solution is then clarified by filtration, with the addition of a little decolourising charcoal. The filtrate is brought to pH 4 by addition of 15 parts of crystalline sodium acetate.

At the same time, 3.45 parts of 2,5-dichloro-1,4-bis-acetoacetylaminobenzene are dissolved in 100 parts of water and 5 parts by volume of 40% strength sodium hydroxide solution, and 5 parts of n-butylsulphoricinoleate are added. This solution is clarified by filtration using a little decolourising charcoal and is then added dropwise to the diazo solution over the course of ½ hour, with good stirring. In the course thereof, the temperature of the reaction mixture rises to 15°–20°C. The mixture is stirred for one hour at room temperature and is then warmed to 80°–85°C for 1 hour and filtered hot, and the product is washed with hot water until free of salt. After drying in vacuo at 95°–100°C, 8.5 parts of a yellow dyestuff of the formula

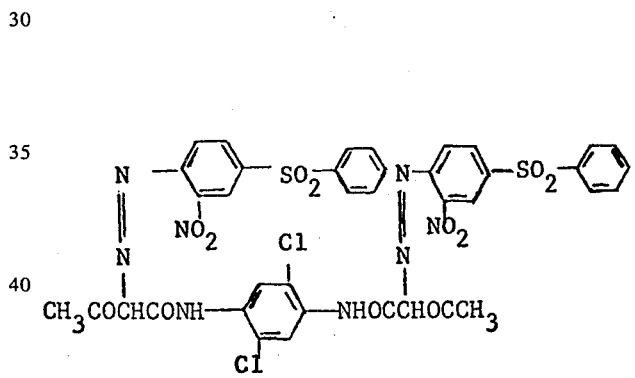

are obtained.

8.5 Parts of the pigment thus obtained are stirred in 60 parts by volume of o-dichlorobenzene for 2 hours at 145°–150°C. In the course thereof, the dyestuff assumes a uniform crystalline form. It is filtered off at 140°C and washed with hot o-dichlorobenzene until the filtrate issues almost colourless, then with cold methanol and finally with hot water. After drying, 6.0 parts of a greenish-tinged yellow pigment dyestuff are obtained. This gives strong and pure greenish-tinged yellow prints when used in printing inks.

The table which follows describes further dyestuffs which are obtained by coupling the diazotised bases of column I with the bis-acetoacetic acid arylides of the diamines of column II. Column III indicates the colour shade of linseed oil varnish coloured with 20% of these pigments.

| | I | II | III |
|---|---|---|---|
| 4 | 2-nitro-aniline | 1,4-phenylenediamine | orange-yellow |
| 5 | " | 2-chloro-1,4-phenylenediamine | yellow |
| 6 | " | 2,5-dichloro-1,4-phenylenediamine | green-yellow |
| 7 | " | 2-chloro-5-methoxy-1,4-phenylenediamine | reddish yellow |
| 8 | " | 2-chloro-5-methyl-1,4-phenylenediamine | yellow |
| 9 | " | 1,3-phenylenediamine | green-yellow |
| 10 | 2-nitro-4-chloro-aniline | 1,4-phenylenediamine | orange-yellow |
| 11 | " | 2-chloro-1,4-phenylenediamine | orange-yellow |
| 12 | " | 2-methyl-1,4-phenylenediamine | " |
| 13 | " | 2-methoxy-1,4-phenylenediamine | orange |
| 14 | " | 2,5-dichloro-1,4-phenylenediamine | yellow |
| 15 | " | 2-chloro-5-methoxy-1,4-phenylenediamine | brown |
| 16 | " | 2-chloro-5-methyl-1,4-phenylenediamine | yellow |
| 17 | " | 2,5-dimethyl-1,4-phenylenediamine | orange |
| 18 | " | 2-methyl-5-methoxy-1,4-phenylenediamine | yellow |
| 19 | " | 1,3-phenylenediamine | red-yellow |
| 20 | 2-nitro-aniline | 2-methoxy-1,4-phenylenediamine | brown |
| 21 | " | 2,5-dimethoxy-1,4-phenylenediamine | brown |
| 22 | 2-nitro-aniline | 2,5-dimethyl-1,4-phenylenediamine | reddish yellow |
| 23 | 2-nitro-4-chloro-aniline | 4-chloro-1,3-phenylenediamine | red-yellow |
| 24 | 2-nitro-5-chloro-aniline | 1,4-phenylenediamine | orange-yellow |
| 25 | " | 2-chloro-1,4-phenylenediamine | yellow |
| 26 | " | 2,5-dichloro-1,4-phenylenediamine | " |
| 27 | " | 2-chloro-5-methoxy-1,4-phenylenediamine | orange-yellow |
| 28 | " | 2-chloro-5-methyl-1,4-phenylenediamine | " |
| 29 | " | 1,3-phenylenediamine | " |
| 30 | 2-nitro-6-chloro-aniline | 1,4-phenylenediamine | " |
| 31 | " | 2-chloro-1,4-phenylenediamine | " |
| 32 | " | 2-chloro-5-methoxy-1,4-phenylenediamine | " |
| 33 | " | 1,3-phenylenediamine | " |
| 34 | 2-nitro-4-methyl-aniline | 1,4-phenylenediamine | reddish yellow |
| 35 | " | 2-chloro-1,4-phenylenediamine | light yellow |
| 36 | " | 2-methyl-1,4-phenylenediamine | yellow |
| 37 | " | 2-methoxy-1,4-phenylenediamine | orange |
| 38 | " | 2,5-dichloro-1,4-phenylenediamine | beige |
| 39 | " | 2-chloro-5-methoxy-1,4-phenylenediamine | reddish yellow |
| 40 | 2-nitro-4-methyl-aniline | 2-chloro-5-methyl-1,4-phenylenediamine | yellow |
| 41 | " | 2,5-dimethyl-1,4-phenylenediamine | orange |
| 42 | " | 2-methyl-5-methoxy-1,4-phenylenediamine | brown |
| 43 | " | 1,3-phenylenediamine | yellow |
| 44 | " | 4-chloro-1,3-phenylenediamine | " |
| 45 | 2-nitro-5-methyl-aniline | 1,4-phenylenediamine | orange |
| 46 | " | 2-chloro-1,4-phenylenediamine | yellow |
| 47 | " | 2-methyl-1,4-phenylenediamine | " |
| 48 | " | 2,5-dichloro-1,4-phenylenediamine | " |
| 49 | " | 2-chloro-5-methoxy-1,4-phenylenediamine | " |
| 50 | " | 2-chloro-5-methyl-1,4-phenylenediamine | " |
| 51 | " | 2,5-dimethyl-1,4-phenylenediamine | orange |
| 52 | " | 1,3-phenylenediamine | " |
| 53 | 2-nitro-4-methoxy-aniline | 1,4-phenylenediamine | " |
| 54 | " | 2-chloro-1,4-phenylenediamine | yellow |
| 55 | " | 2,5-dichloro-1,4-phenylenediamine | " |
| 56 | " | 2-chloro-5-methoxy-1,4-phenylenediamine | orange |
| 57 | 2-nitro-4-trifluoromethyl-aniline | 2,5-dichloro-1,4-phenylenediamine | yellow |
| 58 | 2-nitro-4-methoxy-aniline | 1,3-phenylenediamine | orange |
| 59 | 2-nitro-5-methoxy-aniline | 1,4-phenylenediamine | " |
| 60 | " | 2-chloro-1,4-phenylenediamine | " |
| 61 | " | 2-chloro-5-methoxy-1,4-phenylenediamine | " |
| 62 | " | 1,3-phenylenediamine | " |
| 63 | 2-nitro-5-ethoxy-aniline | 1,4-phenylenediamine | " |
| 64 | " | 2-chloro-1,4-phenylenediamine | " |
| 65 | " | 2-chloro-5-methoxy-1,4-phenylenediamine | " |
| 66 | " | 1,3-phenylenediamine | " |
| 67 | 2-nitro-4,5-dichloro-aniline | 1,4-phenylenediamine | yellow |
| 68 | " | 2-chloro-1,4-phenylenediamine | " |
| 69 | " | 2-chloro-5-methoxy-1,4-phenylenediamine | " |
| 70 | " | 1,3-phenylenediamine | " |
| 71 | 2-nitro-4-methoxy-5-chloro-aniline | 1,4-phenylenediamine | yellow-orange |
| 72 | " | 2-chloro-1,4-phenylenediamine | yellow |
| 73 | "2,5-dichloro-1,4-phenylenediamine | " | |
| 74 | " | 2-chloro-5-methoxy-1,4-phenylenediamine | " |
| 75 | 2-nitro-4-methoxy-5-chloro-aniline | 2-chloro-5-methyl-1,4-phenylenediamine | yellow |
| 76 | " | 1,3-phenylenediamine | " |
| 77 | 3-nitro-aniline | 1,4-phenylenediamine | green-yellow |
| 78 | " | 2-chloro-1,4-phenylenediamine | yellow |
| 79 | " | 2-methyl-1,4-phenylenediamine | " |
| 80 | " | 2,5-dichloro-1,4-phenylenediamine | " |
| 81 | " | 2-chloro-5-methoxy-1,4-phenylenediamine | " |
| 82 | " | 2-chloro-5-methyl-1,4-phenylenediamine | " |
| 83 | " | 2,5-dimethyl-1,4-phenylenediamine | " |
| 84 | 3-nitro-4-methyl-aniline | 1,4-phenylenediamine | " |
| 85 | " | 2-chloro-5-methoxy-1,4-phenylenediamine | " |
| 86 | " | 2-chloro-5-methyl-1,4-phenylenediamine | " |
| 87 | 3-nitro-4-methoxy-aniline | 1,4-phenylenediamine | " |
| 88 | " | 2-chloro-1,4-phenylenediamine | " |
| 89 | " | 2-chloro-5-methoxy-1,4-phenylenediamine | " |

-continued

| | I | II | III |
|---|---|---|---|
| 90 | " | 1,3-phenylenediamine | " |
| 91 | 3-nitro-4-ethoxy-aniline | 1,4-phenylenediamine | " |
| 92 | 3-nitro-aniline | 2-methoxy-1,4-phenylenediamine | red-yellow |
| 93 | 3-nitro-aniline | 2,5-dimethoxy-1,4-phenylenediamine | reddish-yellow |
| 94 | 3-nitro-4-ethoxy-aniline | 2-chloro-1,4-phenylenediamine | yellow |
| 95 | " | 2-chloro-5-methoxy-1,4-phenylenediamine | " |
| 96 | " | 1,3-phenylenediamine | " |
| 97 | 3-nitro-4-chloro-aniline | 1,4-phenylenediamine | " |
| 98 | " | 2-chloro-1,4-phenylenediamine | " |
| 99 | " | 2-chloro-5-methoxy-1,4-phenylenediamine | " |
| 100 | " | 1,3-phenylenediamine | " |
| 101 | 3-nitro-6-chloro-aniline | 1,4-phenylenediamine | " |
| 102 | " | 2-chloro-1,4-phenylenediamine | " |
| 103 | " | 2-chloro-5-methoxy-1,4-phenylenediamine | " |
| 104 | " | 1,3-phenylenediamine | " |
| 105 | 3-nitro-6-methyl-aniline | 1,4-phenylenediamine | " |
| 106 | " | 2-chloro-1,4-phenylenediamine | " |
| 107 | " | 2-chloro-5-methoxy-1,4-phenylenediamine | " |
| 108 | " | 1,3-phenylenediamine | " |
| 109 | 3-nitro-6-methoxy-aniline | 1,4-phenylenediamine | " |
| 110 | 3-nitro-6-methoxy-aniline | 2-chloro-1,4-phenylenediamine | yellow |
| 111 | " | 2-chloro-5-methoxy-1,4-phenylenediamine | " |
| 112 | " | 1,3-phenylenediamine | " |
| 113 | 4-nitro-aniline | 1,4-phenylenediamine | " |
| 114 | " | 2-chloro-1,4-phenylenediamine | " |
| 115 | " | 2,5-dichloro-1,4-phenylenediamine | " |
| 116 | " | 2-chloro-5-methoxy-1,4-phenylenediamine | |
| 117 | " | 2-chloro-5-methyl-1,4-phenylenediamine | |
| 118 | " | 1,3-phenylenediamine | " |
| 119 | 4-nitro-2-chloro-aniline | 2-chloro-1,4-phenylenediamine | " |
| 120 | " | 2-cyano-1,4-phenylenediamine | " |
| 121 | " | 2-methyl-1,4-phenylenediamine | " |
| 122 | " | 2-methoxy-1,4-phenylenediamine | " |
| 123 | " | 2-nitro-1,4-phenylenediamine | " |
| 124 | " | 2,5-dichloro-1,4-phenylenediamine | " |
| 125 | " | 2,6-dichloro-1,4-phenylenediamine | " |
| 126 | " | 2-chloro-5-methyl-1,4-phenylenediamine | " |
| 127 | 4-nitro-2-chloro-aniline | 2,5-dimethyl-1,4-phenylenediamine | orange |
| 128 | 4-nitro-2-chloro-aniline | 2-methyl-5-methoxy-1,4-phenylenediamine | orange |
| 129 | " | 2,3,5,6-tetrachloro-1,4-phenylenediamine | " |
| 130 | " | 1,3-phenylenediamine | " |
| 131 | " | 4-chloro-1,3-phenylenediamine | " |
| 132 | " | 4-methyl-1,3-phenylenediamine | " |
| 133 | " | 4-methoxy-1,3-phenylenediamine | " |
| 134 | 4-nitro-2-methoxy-aniline | 1,4-phenylenediamine | orange-yellow |
| 135 | " | 2-chloro-1,4-phenylenediamine | yellow |
| 136 | " | 2-cyano-1,4-phenylenediamine | " |
| 137 | " | 2-methyl-1,4-phenylenediamine | orange-yellow |
| 138 | " | 2-methoxy-1,4-phenylenediamine | " |
| 139 | " | 2-nitro-1,4-phenylenediamine | " |
| 140 | " | 2,5-dichloro-1,4-phenylenediamine | yellow |
| 141 | " | 2,6-dichloro-1,4-phenylenediamine | " |
| 142 | " | 2-chloro-5-methyl-1,4-phenylenediamine | " |
| 143 | " | 2-chloro-5-methoxy-1,4-phenylenediamine | " |
| 144 | " | 2,5-dimethyl-1,4-phenylenediamine | red-yellow |
| 145 | " | 2-methyl-5-methoxy-1,4-phenylenediamine | red-yellow |
| 146 | 4-nitro-2-methoxy-aniline | 2,3,5,6-tetrachloro-1,4-phenylenediamine | red-yellow |
| 147 | " | 1,3-phenylenediamine | yellow |
| 148 | " | 4-chloro-1,3-phenylenediamine | " |
| 149 | " | 4-methyl-1,3-phenylenediamine | " |
| 150 | " | 4-methoxy-1,3-phenylenediamine | " |
| 151 | 4-nitro-2-ethoxy-aniline | 1,4-phenylenediamine | orange |
| 152 | " | 2-chloro-1,4-phenylenediamine | yellow |
| 153 | " | 2-methyl-1,4-phenylenediamine | " |
| 154 | " | 2-methoxy-1,4-phenylenediamine | " |
| 155 | " | 2,5-dichloro-1,4-phenylenediamine | " |
| 156 | " | 2-chloro-5-methoxy-1,4-phenylenediamine | " |
| 157 | " | 2-chloro-5-methyl-1,4-phenylenediamine | " |
| 158 | " | 2,5-dimethyl-1,4-phenylenediamine | " |
| 159 | " | 2-methyl-5-methoxy-1,4-phenylenediamine | " |
| 160 | " | 1,3-phenylenediamine | " |
| 161 | " | 4-chloro-1,3-phenylenediamine | " |
| 162 | 4-nitro-3-ethoxy-aniline | 1,4-phenylenediamine | " |
| 163 | " | 2-chloro-1,4-phenylenediamine | " |
| 164 | 4-nitro-3-ethoxy-aniline | 2-chloro-5-methoxy-1,4-phenylenediamine | yellow |
| 165 | " | 1,3-phenylenediamine | " |
| 166 | 4-nitro-2-cyano-aniline | 1,4-phenylenediamine | " |
| 167 | " | 2-chloro-1,4-phenylenediamine | " |
| 168 | " | 2-methyl-1,4-phenylenediamine | " |
| 169 | " | 2,5-dichloro-1,4-phenylenediamine | " |
| 170 | " | 2-chloro-5-methoxy-1,4-phenylenediamine | " |
| 171 | " | 2-chloro-5-methyl-1,4-phenylenediamine | " |
| 172 | " | 2,5-dimethyl-1,4-phenylenediamine | " |
| 173 | " | 1,3-phenylenediamine | " |
| 174 | 4-nitro-2-methyl-aniline | 1,4-phenylenediamine | " |
| 175 | " | 2-chloro-1,4-phenylenediamine | light yellow |
| 176 | " | 2-cyano-1,4-phenylenediamine | yellow |
| 177 | " | 2-methyl-1,4-phenylenediamine | " |
| 178 | " | 2-methoxy-1,4-phenylenediamine | orange |
| 179 | " | 2-nitro-1,4-phenylenediamine | yellow |
| 180 | " | 2,5-dichloro-1,4-phenylenediamine | " |

-continued

| | I | II | III |
|---|---|---|---|
| 181 | " | 2,6-dichloro-1,4-phenylenediamine | " |
| 182 | 4-nitro-2-methyl-aniline | 2-chloro-5-methyl-1,4-phenylenediamine | yellow |
| 183 | " | 2-chloro-5-methoxy-1,4-phenylenediamine | " |
| 184 | " | 2,5-dimethyl-1,4-phenylenediamine | " |
| 185 | " | 2-methyl-5-methoxy-1,4-phenylenediamine | maroon |
| 186 | " | 2,3,5,6-tetrachloro-1,4-phenylenediamine | " |
| 187 | " | 1,3-phenylenediamine | yellow |
| 188 | " | 4-chloro-1,3-phenylenediamine | " |
| 189 | " | 4-methyl-1,3-phenylenediamine | " |
| 190 | " | 4-methoxy-1,3-phenylenediamine | " |
| 191 | 4-nitro-2,5-dichloro-aniline | 1,4-phenylenediamine | |
| 192 | " | 2-chloro-1,4-phenylenediamine | " |
| 193 | " | 2,5-dichloro-1,4-phenylenediamine | " |
| 194 | " | 2-chloro-5-methoxy-1,4-phenylenediamine | " |
| 195 | " | 2-chloro-5-methyl-1,4-phenylenediamine | " |
| 196 | " | 1,3-phenylenediamine | " |
| 197 | 4-nitro-2,6-dichloro-aniline | 1,4-phenylenediamine | |
| 198 | " | 2-chloro-1,4-phenylenediamine | " |
| 199 | 4-nitro-2,6-dichloro-aniline | 2-chloro-5-methoxy-1,4-phenylenediamine | yellow |
| 200 | " | 1,3-phenylenediamine | " |
| 201 | 4-nitro-2-chloro-5-methyl-aniline | 1,4-phenylenediamine | |
| 202 | " | 2-chloro-1,4-phenylenediamine | " |
| 203 | " | 2,5-dichloro-1,4-phenylenediamine | " |
| 204 | " | 2-chloro-5-methoxy-1,4-phenylenediamine | " |
| 205 | " | 2-chloro-5-methyl-1,4-phenylenediamine | " |
| 206 | " | 1,3-phenylenediamine | " |
| 207 | 4-nitro-5-chloro-2-methyl-aniline | 1,4-phenylenediamine | |
| 208 | " | 2-chloro-1,4-phenylenediamine | " |
| 209 | " | 2,5-dichloro-1,4-phenylenediamine | " |
| 210 | " | 2-chloro-5-methoxy-1,4-phenylenediamine | " |
| 211 | " | 2-chloro-5-methyl-1,4-phenylenediamine | " |
| 212 | " | 1,3-phenylenediamine | " |
| 213 | 4-nitro-2-chloro-5-methoxy-aniline | 1,4-phenylenediamine | |
| 214 | 4-nitro-2-chloro-5-methoxy-aniline | 2-chloro-1,4-phenylenediamine | yellow |
| 215 | " | 2-methyl-1,4-phenylenediamine | " |
| 216 | " | 2-methoxy-1,4-phenylenediamine | " |
| 217 | " | 2,5-dichloro-1,4-phenylenediamine | " |
| 218 | " | 2-chloro-5-methoxy-1,4-phenylenediamine | " |
| 219 | " | 2-chloro-5-methyl-1,4-phenylenediamine | " |
| 220 | " | 2,5-dimethyl-1,4-phenylenediamine | " |
| 221 | " | 2-methyl-5-methoxy-1,4-phenylenediamine | " |
| 222 | " | 1,3-phenylenediamine | " |
| 223 | " | 4-chloro-1,3-phenylenediamine | " |
| 224 | 4-nitro-5-chloro-2-methoxy-aniline | 1,4-phenylenediamine | |
| 225 | " | 2-chloro-1,4-phenylenediamine | " |
| 226 | " | 2-methyl-1,4-phenylenediamine | " |
| 227 | " | 2-methoxy-1,4-phenylenediamine | " |
| 228 | " | 2,5-dichloro-1,4-phenylenediamine | " |
| 229 | " | 2-chloro-5-methoxy-1,4-phenylenediamine | " |
| 230 | " | 2-chloro-5-methyl-1,4-phenylenediamine | " |
| 231 | 4-nitro-5-chloro-2-methoxy-aniline | 2,5-dimethyl-1,4-phenylenediamine | yellow |
| 232 | " | 2-methyl-5-methoxy-1,4-phenylenediamine | orange |
| 233 | " | 1,3-phenylenediamine | yellow |
| 234 | " | 4-chloro-1,3-phenylenediamine | " |
| 235 | 4-nitro-2,5-dimethyl-aniline | 1,4-phenylenediamine | |
| 236 | " | 2-chloro-1,4-phenylenediamine | " |
| 237 | " | 2,5-dichloro-1,4-phenylenediamine | " |
| 238 | " | 2-chloro-5-methoxy-1,4-phenylenediamine | " |
| 239 | " | 2-chloro-5-methyl-1,4-phenylenediamine | " |
| 240 | " | 1,3-phenylenediamine | " |
| 241 | 4-nitro-2,5-dimethoxy-aniline | 1,4-phenylenediamine | |
| 242 | " | 2-chloro-1,4-phenylenediamine | " |
| 243 | " | 2-methyl-1,4-phenylenediamine | yellow |
| 244 | " | 2-methoxy-1,4-phenylenediamine | orange-yellow |
| 245 | " | 2,5-dichloro-1,4-phenylenediamine | brown |
| 246 | " | 2-chloro-5-methoxy-1,4-phenylenediamine | yellow |
| 247 | 4-nitro-2,5-dimethoxy-aniline | 2-chloro-5-methyl-1,4-phenylenediamine | yellow |
| 248 | " | 2,5-dimethyl-1,4-phenylenediamine | orange-yellow |
| 249 | " | 2-methyl-5-methoxy-1,4-phenylenediamine | " |
| 250 | " | 1,3-phenylenediamine | " |
| 251 | " | 4-chloro-1,3-phenylenediamine | " |
| 252 | 4-nitro-2,5-diethoxy-aniline | 1,4-phenylenediamine | |
| 253 | " | 2-chloro-1,4-phenylenediamine | " |
| 254 | " | 2-chloro-5-methoxy-1,4-phenylenediamine | " |
| 255 | " | 1,3-phenylenediamine | " |
| 256 | 4-nitro-2-methoxy-5-methyl-aniline | 1,4-phenylenediamine | yellow |
| 257 | " | 2-chloro-1,4-phenylenediamine | " |

| | I | II | III |
|---|---|---|---|
| 258 | " | 2-methyl-1,4-phenylenediamine | " |
| 259 | " | 2-methoxy-1,4-phenylenediamine | " |
| 260 | " | 2,5-dichloro-1,4-phenylenediamine | " |
| 261 | " | 2-chloro-5-methoxy-1,4-phenylenediamine | " |
| 262 | " | 2-chloro-5-methyl-1,4-phenylenediamine | " |
| 263 | 4-nitro-2-methoxy-5-methyl-aniline | 2,5-dimethyl-1,4-phenylenediamine | yellow |
| 264 | " | 2-methyl-5-methoxy-1,4-phenylenediamine | " |
| 265 | " | 1,3-phenylenediamine | " |
| 266 | " | 4-chloro-1,3-phenylenediamine | " |
| 267 | 2,4-dinitro-aniline | 1,4-phenylenediamine | " |
| 268 | " | 2-chloro-1,4-phenylenediamine | " |
| 269 | " | 2,5-dichloro-1,4-phenylenediamine | " |
| 270 | " | 2-chloro-5-methoxy-1,4-phenylenediamine | " |
| 271 | " | 2-chloro-5-methyl-1,4-phenylenediamine | " |
| 272 | " | 1,3-phenylenediamine | " |
| 273 | 2,4-dinitro-6-chloro-aniline | 1,4-phenylenediamine | " |
| 274 | " | 2-chloro-1,4-phenylenediamine | " |
| 275 | " | 2,5-dichloro-1,4-phenylenediamine | " |
| 276 | " | 2-chloro-5-methoxy-1,4-phenylenediamine | " |
| 277 | " | 2-chloro-5-methyl-1,4-phenylenediamine | " |
| 278 | " | 1,3-phenylenediamine | " |
| 279 | 2,4-dinitro-6-cyano-aniline | 1,4-phenylenediamine | " |
| 280 | 2,4-dinitro-6-cyano-aniline | 2-chloro-1,4-phenylenediamine | yellow |
| 281 | " | 2,5-dichloro-1,4-phenylenediamine | " |
| 282 | " | 2-chloro-5-methoxy-1,4-phenylenediamine | " |
| 283 | " | 2-chloro-5-methyl-1,4-phenylenediamine | " |
| 284 | " | 1,3-phenylenediamine | " |
| 285 | 2-amino-5-nitro-benzophenone | 1,4-phenylenediamine | " |
| 286 | " | 2-methoxy-1,4-phenylenediamine | reddish-tinged yellow |
| 287 | " | 2,5-dimethyl-1,4-phenylenediamine | " |
| 288 | " | 2-chloro-5-methyl-1,4-phenylenediamine | yellow |
| 289 | " | 2,5-dichloro-1,4-phenylenediamine | greenish-tinged yellow |
| 290 | " | 2-chloro-5-methoxy-1,4-phenylenediamine | yellow |
| 291 | 3-nitro-4-amino-benzophenone | 2,5-dichloro-1,4-phenylenediamine | greenish-tinged yellow |
| 292 | " | 1,4-phenylenediamine | yellow |
| 293 | 3-nitro-4-amino-4'-chlorobenzophenone | " | " |
| 294 | 3-nitro-4-amino-4'-methyl-benzophenone | " | " |
| 295 | 3-nitro-4-amino-4'-methoxy-benzophenone | 1,4-phenylenediamine | yellow |
| 296 | 2-amino-5-nitro-4'-methoxy-benzophenone | 2,5-dichloro-1,4-phenylenediamine | greenish-tinged yellow |
| 297 | 2-amino-5-nitro-4'-chloro-benzophenone | " | " |
| 298 | 2-amino-5-nitro-4'-methyl-benzophenone | " | " |
| 299 | 2-amino-3-nitro-benzophenone | " | " |
| 300 | 2-amino-5-nitro-4'-methyl-diphenylsulphone | 1,4-phenylenediamine | yellow |
| 301 | 3-nitro-4-amino-diphenylsulphone | " | " |
| 302 | " | 2,5-dimethyl-1,4-phenylenediamine | reddish-tinged yellow |
| 303 | 3-nitro-4-amino-4'-chloro-diphenylsulphone | 2,5-dichloro-1,4-phenylenediamine | greenish-tinged yellow |
| 304 | 3-nitro-4-amino-4'-methyl-diphenylsulphone | " | " |
| 305 | 3-nitro-4-amino-4'-methoxy-diphenylsulphone | " | " |
| 306 | 2-amino-5-nitro-benzophenone | 1,3-phenylenediamine | yellow |
| 307 | 3-nitro-4-amino-diphenylsulphone | 1,3-phenylenediamine | yellow |
| 308 | 2-nitro-4-trifluoromethyl-aniline | 1,4-phenylenediamine | orange |
| 309 | " | 1,3-phenylenediamine | orange-yellow |
| 310 | 4-nitro-2-trifluoromethyl-aniline | 1,4-phenylenediamine | yellow |
| 311 | " | 1,3-phenylenediamine | yellow |
| 312 | 4-nitro-2-methoxy-aniline | 2-methoxycarbonyl-1,4-phenylenediamine | yellow |
| 313 | " | 2,5-diethoxycarbonyl-1,4-phenylenediamine | yellow |
| 314 | " | 2-phenoxy-1,4-phenylenediamine | yellow |
| 315 | " | 2-trifluoromethyl-1,4-phenylenediamine | yellow |

EXAMPLE 316

27.6 Parts of 4-nitro-aniline are dissolved in 100 parts of warm glacial acetic acid and run, whilst stirring, into a solution of 50 parts of concentrated hydrochloric acid and 10 parts of the sodium salt of N-benzyl-μ-heptadecylbenzimidazole-disulphonic acid in 100 parts of ice water; the mixture is then diazotised at 0°–5°C with 50 parts of 4 N sodium nitrite solution and clarified by filtration.

Separately, 27.6 parts of 1,3-bis-acetoacetylaminobenzene are dissolved in a mixture of 22 parts of 40% strength sodium hydroxide solution and 800 parts of water and the solution is clarified by filtration.

The two solutions, if necessary after dilution with water, are fed continuously to a mixing nozzle, where instantaneous coupling of the components takes place. The pH value in the mixing nozzle is kept at between 4.5 and 5.5 by regulating the feed of the solutions. The temperature should be approx. 30°C. This setting can be regulated by addition of water to the solutions of the components. The resulting dyestuff suspension is filtered off and the filter residue is washed; it is then stirred with 1,800 parts of o-dichlorobenzene and the mixture is heated to 100°C and filtered hot. The filter residue is washed first with ethylene glycol monomethyl ether and then with methanol and finally with water and is dried in vacuo at 70°C. The dyestuff thus obtained corresponds to the formula

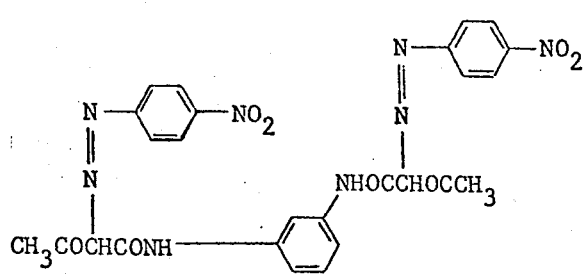

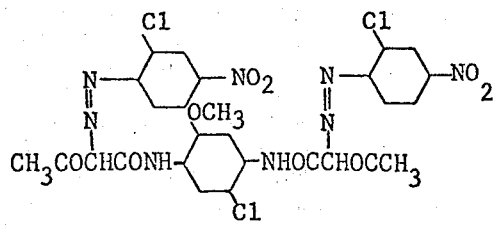

are obtained. The pigment thus prepared is outstandingly suitable for the manufacture of printing inks, of good flow, for the graphic trade, and gives very strong, pure yellow prints of good gloss and transparency.

The treatment in the organic solvent can also be effected directly with the moist filter cake without prior drying. Thus, the moist press cake can be stirred in picoline at 100°–120°C, filtered off and washed with methanol and subsequently with dilute hydrochloric acid, or the moist press cake is stirred in chlorobenzene, o-dichlorobenzene or nitrobenzene, freed from water by azeotrope distillation and then worked up as described above.

The table which follows describes further dyestuffs which are obtained by diazotisation and coupling in organic solvents of the bases of column I with the bis-acetoacetic acid arylides of the diamines of column II. Column III indicates the colour shade of the linseed oil varnish coloured with 20% of these pigments.

| | I | II | III |
|---|---|---|---|
| 318 | 2-Methoxy-4-nitro-aniline | 1,4-phenylenediamine | orange-yellow |
| 319 | 2-methoxy-5-nitro-aniline | 2,5-dichloro-1,4-phenylenediamine | green-yellow |
| 320 | 4-methoxy-2-nitro-aniline | 1,4-phenylenediamine | orange-yellow |
| 321 | 4-chloro-2-nitro-aniline | 1,4-phenylenediamine | " |
| 322 | 5-chloro-2-nitro-aniline | 2,5-dimethyl-1,4-phenylenediamine | " |

EXAMPLE 317

3.8 Parts of 2-chloro-4-nitro-aniline and 3.4 parts of 2-chloro-5-methoxy-1,4-aceto-acetylaminobenzene are dissolved in 200 parts of dichlorobenzene and 50 parts of glacial acetic acid at 50°C. After cooling to room temperature, 2.5 parts of tert.-butyl nitrite in 100 ml of dichlorobenzene are added dropwise over the course of 15 minutes, during which the temperature rises to 40°C and the formation of the pigment commences.

The mixture is then stirred for 2 hours at 40° – 50°C and 18 hours at 130° – 140°C. In the course thereof, the dyestuff assumes a uniform crystalline form. Orange, crystalline aggregates 10 – 20 μ long are detectable under the microscope. The mixture is filtered at 140°C, the dyestuff is washed with hot dichlorobenzene until the filtrate issues colourless, the dichlorobenzene is displaced by methanol and finally the dyestuff is washed with hot water. After drying, 4.8 parts of an orange-yellow dyestuff of the formula

EXAMPLE 323

1.8 Parts of 2-chloro-4-nitro-aniline and 1.8 parts of 4-chloro-2-nitro-aniline in 150 parts by volume of glacial acetic acid and 75 parts of water are stirred with 6 parts by volume of concentrated hydrochloric acid, whereupon the hydrochloride of the base is formed. After addition of 80 parts of ice and subsequent cooling to 0° – 5°C, 6 parts by volume of 4 N sodium nitrite are added dropwise. The yellow diazo solution is stirred at 0° – 5°C until only traces of nitrous acid remain detectable. The diazo solution is then clarified by filtration with addition of a little decolourising charcoal. The filtrate is brought to pH 4 by addition of 20 parts of crystalline sodium acetate.

At the same time, 2.76 parts of 1,4-bis-acetoacetylaminobenzene and 3 parts by volume of 40% strength sodium hydroxide solution are dissolved in 200 parts of ethanol and 5 parts of n-butyl-sulphoricinoleate are added. This solution is clarified by filtration with 0.5 part of decolourising charcoal and is then added dropwise over the course of 1 to 1½ hours to the diazo solution, whilst stirring well. In the course thereof, the temperature of the reaction mixture rises to 15° – 20°C. After completion of the dropwise addition, no further diazo compound is detectable in the mixture. The mixture is stirred for one hour at room temperature, then warmed to 80° – 85°C over the course of 1 hour and filtered hot, and the product is washed with hot water until free of salt. After drying at 95° – 100°C in vacuo, 5.3 parts of an orange-yellow dyestuff are obtained, which very probably consists of a mixture of the three dyestuffs of the formulae methanol and subsequently with dilute hydrochloric acid, or the moist press cake is stirred in chlorobenzene, o-dichlorobenzene or nitrobenzene and freed from water by azeotropic distillation and then worked up as described above.

The table which follows describes further dyestuffs which are obtained by coupling the diazotised bases of column I and II with the bis-acetoacetic acid arylides of the diamines of column III. Column IV gives the colour shade of a linseed oil varnish coloured with 20% of these pigments.

| | I | II | III | IV |
|---|---|---|---|---|
| 324 | 2-Methoxy-4-nitro-aniline | 4-methoxy-2-nitro-aniline | 2,5-dichloro-1,4-phenylenediamine | reddish-yellow |
| 325 | 2-methoxy-5-nitro-aniline | 5-chloro-2-nitro-aniline | 1,4-phenylenediamine | yellow |
| 326 | 2-methoxy-5-nitro-aniline | 4-methoxy-2-nitro-aniline | 1,4-phenylenediamine | light claret |
| 327 | 2-methyl-5-nitro-aniline | 2-nitro-4-methyl-aniline | 1,4-phenylenediamine | yellow |

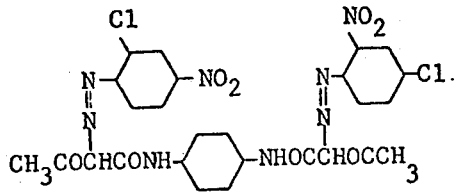

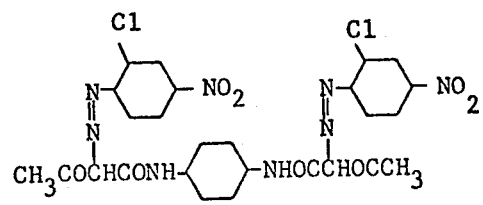

and

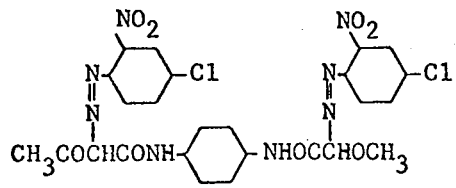

2.5 Parts of the pigment thus obtained are stirred in 160 parts by volume of dimethylformamide for 22 hours at 140° – 150°C. Yellowish crystalline aggregates of 5 – 10 μ length are detectable under the microscope. The product is filtered off at 140°C and washed with hot dimethylformamide until the filtrate issues colourless, the dimethylformamide is displaced by methanol and finally the product is again washed with hot water. After drying, 3.6 parts of a luminous yellow pigment dyestuff are obtained. The pigment prepared in this way is outstandingly suitable for the manufacture of printing inks, possessing good flow, for the graphic trade, and gives very strong, pure yellow prints of good gloss and transparency.

The treatment in the organic solvent can also be carried out directly with the moist filter cake without prior drying. Thus, the moist press cake can be stirred in picoline at 100° – 120°C, filtered off and washed with

EXAMPLE 328

10 Parts (65% strength aqueous paste) of the diazoamino compound of the formula

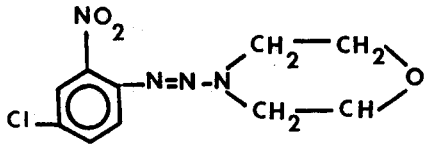

and 3.1 parts of 2,5-dimethyl-1,4-bis-acetoacetylaminobenzene are stirred into 100 parts of o-dichlorobenzene and warmed to 90°C. 3 parts of trichloroacetic acid are then added. The mixture is stirred for 2 hours at a temperature of 125°C and the dyestuff formed is then filtered off, washed with hot o-dichlorobenzene, then with cold methanol and finally with water. After drying in vacuo at 90° to 100°C, a soft-grained orange pigment is obtained, which dyes polyvinyl chloride in red shades which are fast to migration and to light. The pigment has the following structural formula:

EXAMPLE 329

1.00 g Of the pigment prepared according to Example 1 is finely ground with 4.00 g of printing varnish composed of 29.4% of linseed oil/stand oil (300 poise), 67.2% of linseed oil/stand oil (20 poise), 2.1% of cobalt octoate (8% Co) and 1.3% of lead octoate (24% Pb) on an Engelsmann grinding machine and the mixture is then printed onto art printing paper by means of a block, using the letterpress printing process and applying 1 g/m². A strong, pure orange-tinged yellow shade of good transparency and good gloss is obtained. In three-colour or four-colour printing, very brilliant green shades can be produced by overprinting on blue.

The pigment is also suitable for other printing processes, such as gravure printing, offset printing and flexographic printing and here again gives very good results.

What we claim is:

1. Disazo pigment of the formula

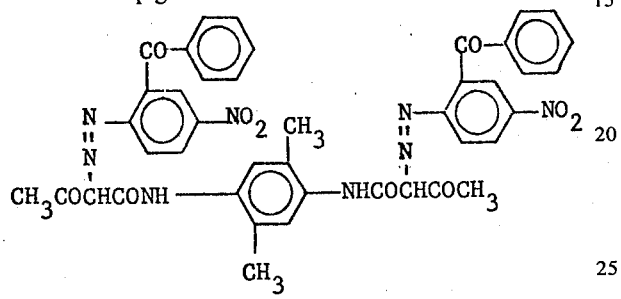

2. Disazo pigment of the formula

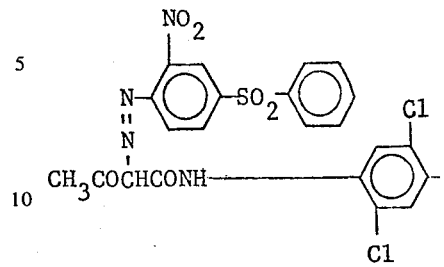

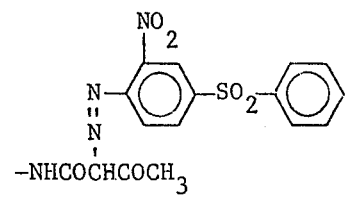

* * * * *